United States Patent
Gissin et al.

(10) Patent No.: US 10,838,665 B2
(45) Date of Patent: Nov. 17, 2020

(54) METHOD, DEVICE, AND SYSTEM FOR BUFFERING DATA FOR READ/WRITE COMMANDS IN NVME OVER FABRIC ARCHITECTURE

(71) Applicant: HUAWEI TECHNOLOGIES CO., LTD., Guangdong (CN)

(72) Inventors: Victor Gissin, Shenzhen (CN); Xin Qiu, Shenzhen (CN); Pei Wu, Hangzhou (CN); Huichun Qu, Hangzhou (CN); Jinbin Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 2 days.

(21) Appl. No.: 15/716,791

(22) Filed: Sep. 27, 2017

(65) Prior Publication Data

US 2018/0157445 A1    Jun. 7, 2018

Related U.S. Application Data

(63) Continuation of application No. PCT/CN2016/108601, filed on Dec. 5, 2016.

(51) Int. Cl.
*G06F 3/06* (2006.01)
*G06F 13/28* (2006.01)
(Continued)

(52) U.S. Cl.
CPC .......... *G06F 3/0688* (2013.01); *G06F 3/061* (2013.01); *G06F 3/067* (2013.01); *G06F 3/0631* (2013.01);
(Continued)

(58) Field of Classification Search
CPC ...... G06F 3/061; G06F 3/0656; G06F 3/0659; G06F 3/0688; G06F 12/0246; G06F 3/0631; G06F 3/0653
(Continued)

(56) References Cited

U.S. PATENT DOCUMENTS 8,578,106 B1  11/2013  Shapiro
9,026,735 B1  5/2015  Torok et al.
(Continued)

FOREIGN PATENT DOCUMENTS

CN    101013409 A    8/2007
CN    101093466 A    12/2007
(Continued)

OTHER PUBLICATIONS

NVM Express over Fabrics, Revision 1.0, Jun. 5, 2016, total 49 pages.

*Primary Examiner* — Than Nguyen
(74) *Attorney, Agent, or Firm* — Huawei Technologies Co., Ltd.

(57) ABSTRACT

A control device for a non-volatile memory express (NVMe) over fabric architecture is provided. The control device comprises a network adapter and a processor coupled to the network adapter by a bus. Data is transmitted between the control device and a storage device in the NVMe over fabric architecture. The processor is configured to obtain an available storage space of the storage device, determine whether a storage space required by a first data to be transmitted according to a first data read/write command is equal to or less than the available storage space, and send the first data read/write command to the storage device if the storage space required by the first data is equal or less than to the available storage space and suspend sending of the first data read/write command if the storage space occupied by the first data is greater than the available storage space.

11 Claims, 7 Drawing Sheets

(51) Int. Cl.
*G06F 13/42* (2006.01)
*G06F 12/02* (2006.01)

(52) U.S. Cl.
CPC .......... *G06F 3/0656* (2013.01); *G06F 3/0659* (2013.01); *G06F 3/0679* (2013.01); *G06F 12/0246* (2013.01); *G06F 13/28* (2013.01); *G06F 13/4221* (2013.01); *G06F 3/0653* (2013.01); *G06F 2003/0692* (2013.01); *G06F 2212/2022* (2013.01); *G06F 2212/7203* (2013.01)

(58) Field of Classification Search
USPC .................................. 710/56; 711/103, 170
See application file for complete search history.

(56) References Cited

U.S. PATENT DOCUMENTS

| | | | | |
|---|---|---|---|---|
| 2007/0177430 | A1* | 8/2007 | Morio | ..................... G06F 13/28 365/185.22 |
| 2008/0052432 | A1 | 2/2008 | Wilson et al. | |
| 2009/0193182 | A1 | 7/2009 | Nitta | |
| 2011/0208913 | A1 | 8/2011 | Suzuki et al. | |
| 2014/0215001 | A1 | 7/2014 | Tucek et al. | |
| 2015/0254088 | A1* | 9/2015 | Chou | .................. G06F 9/45541 709/212 |
| 2015/0317088 | A1 | 11/2015 | Hussain et al. | |
| 2015/0378606 | A1 | 12/2015 | Huang | |
| 2016/0077740 | A1 | 3/2016 | Hussain et al. | |
| 2016/0179718 | A1 | 6/2016 | Morris et al. | |
| 2018/0060259 | A1 | 3/2018 | Morris et al. | |
| 2018/0121354 | A1* | 5/2018 | Ishiyama | ............... G06F 3/0616 |
| 2018/0188952 | A1* | 7/2018 | Carlton | ................. G06F 3/0679 |

FOREIGN PATENT DOCUMENTS

| | | |
|---|---|---|
| CN | 101387943 A | 3/2009 |
| CN | 101499036 A | 8/2009 |
| CN | 102075436 A | 5/2011 |
| CN | 102103545 A | 6/2011 |
| CN | 102169363 A | 8/2011 |
| CN | 103135957 | 6/2013 |
| CN | 104536701 A | 4/2015 |
| CN | 105718391 A | 6/2016 |
| CN | 106095694 A | 11/2016 |

* cited by examiner

METHOD, DEVICE, AND SYSTEM FOR BUFFERING DATA FOR READ/WRITE COMMANDS IN NVME OVER FABRIC ARCHITECTURE

CROSS-REFERENCE TO RELATED APPLICATIONS

This application is a continuation of International Application No. PCT/CN2016/108601, filed on Dec. 5, 2016, the disclosure of which is hereby incorporated by reference in its entirety.

TECHNICAL FIELD

The present disclosure relates to the field of information technologies, and in particular, to a method, device, and system for controlling a data read/write command in a non-volatile memory express NVMe over fabric architecture.

BACKGROUND

Non-volatile memory express (NVMe) is a controller interface standard in which queue transmission mechanisms between an NVMe device and a host that are connected using a Peripheral Component Interconnect Express (PCIe) bus are unified, a queue interface is optimized, and the like.

After a published NVMe standard for a PCIe architecture has made a great success in the industry, the NVMe standard is expected to be extended to the data center field quickly in the industry. However, because of a limited quantity of existing PCIe networks in the data center field and disadvantages (scalability, a long-distance connection, and the like) of a PCIe protocol, an NVMe protocol is being promoted in the industry to run in networks such as iWarp, remote direct memory access over Converged Ethernet (ROCE), Infiniband, a fiber channel (FC), and Omni-Path, to provide more flexible and wider application. In the industry, the application of running the NVMe protocol in networks such as the iWarp, the ROCE, the Infiniband, the FC, and the Omni-Path is referred to as NVMe over fabric (NOF for short).

In an NVMe over fabric architecture, a host represents a host, and the host is responsible for initiating data reading/writing, and a target represents a target storage device, responsible for receiving and executing a command sent by the host. After the target receives a write command sent by the host, a network adapter in the target parses content in the write command to obtain a length of data to be transmitted according to the write command, and allocates a corresponding storage space in a network adapter memory, to buffer data that is to be transmitted by the host. After buffering the data to be transmitted, the network adapter in the target migrates the buffered data to a destination hard disk in the target. The host reads, using a similar implementation process, the data from the hard disk in the target using a read command. That is, the data in the hard disk in the target needs to be first buffered in the network adapter memory, and then the data buffered in the network adapter memory is sent to the host.

In a specific service implementation, the network adapter memory of the network adapter may be insufficient. That is, data transmitted by the host using a command (including a write command or a read command) cannot be buffered in a storage space of the network adapter memory. In this case, a command sent by the host fails to be executed. The host cannot reapply for an available storage space until another storage space of the network adapter memory is released. In addition, an unexecuted command needs to be buffered in the network adapter in the target, and the network adapter in the target needs to wait for release of a memory space, reallocate an available memory space, and the like. In such an implementation, a network adapter in a target has a complex implementation and poor maintainability when processing a case of an insufficient network adapter memory.

SUMMARY

A method for controlling a data read/write command between a control device and a storage device in a non-volatile memory express (NVMe) over fabric architecture is provided. The storage device comprises a data processing unit, a buffer unit, and a storage unit. The control device stores, in the storage unit, data that needs to be read/written. The data processing unit is configured to receive a data read/write command sent by the control device. The buffer unit is configured to buffer data to be transmitted according to the read/write command. The method comprises obtaining, by the control device, an available storage space of the buffer unit, determining, by the control device, whether a storage space occupied by first data to be transmitted according to a first data read/write command is less than or equal to the available storage space of the buffer unit, and sending the first data read/write command to the storage device if the storage space occupied by the first data is less than or equal to the available storage space of the buffer unit and suspending sending of the first data read/write command if the storage space occupied by the first data is greater than the available storage space of the buffer unit.

A control device for a non-volatile memory express (NVMe) over fabric architecture is provided. The control device comprises a network adapter and a processor coupled to the network adapter by a bus. Data is transmitted between the control device and a storage device in the NVMe over fabric architecture. The processor is configured to obtain an available storage space of the storage device, determine whether a storage space required by a first data to be transmitted according to a first data read/write command is equal to or less than the available storage space, and send the first data read/write command to the storage device if the storage space required by the first data is equal or less than to the available storage space and suspend sending of the first data read/write command if the storage space occupied by the first data is greater than the available storage space.

A system for controlling a data read/write command in a non-volatile memory express (NVMe) over fabric architecture is provided. The system comprises a storage device and a control device in communication with the storage device. The storage device comprises a data processing unit, a buffer unit, and a storage unit. Data to be read/written is stored in the storage unit and the buffer unit is configured to buffer data to be transmitted according to the read/write command. The control device is configured to obtain an available storage space of the buffer unit, determine whether a storage space occupied by first data to be transmitted according to a first data read/write command is less than or equal to the available storage space, and send the first data read/write command to the storage device if the storage space occupied by the first data is less than or equal to the available storage space and suspend sending of the first data read/write command if the storage space occupied by the first data is greater than the available storage space. The data processing unit of the storage device is configured to receive the first data read/write command sent by the control device, and buffer, in the buffer unit, the first data to be transmitted according to the first data read/write command.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following describes the embodiments of the present disclosure with reference to the accompanying drawings. The terms "first" and "second" in the embodiments of the present disclosure are intended for a description purpose, and shall not be understood as an indication or implication of relative importance or implicit indication of a quantity of indicated technical features. Therefore, a feature limited by "first" or "second" may explicitly or implicitly include one or more features.

Embodiments of the present disclosure provide a method, device, and/or system for controlling a data read/write command in an NVMe over fabric architecture, to resolve a problem of a complex processing mechanism caused by buffering a data read/write command when a storage space of a network adapter memory in a target is insufficient.

Figure 1:
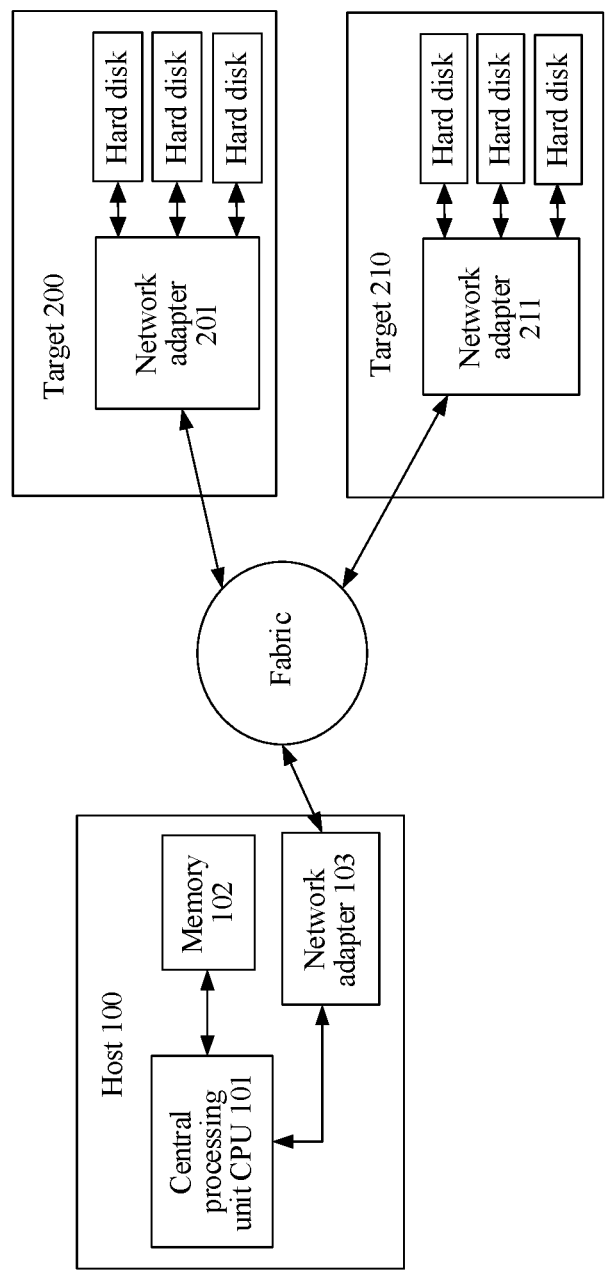
FIG. 1 is a schematic architectural diagram of an implementation in NVMe over fabric.

FIG. 1 is a schematic architectural diagram of an implementation in NVMe over fabric. FIG. 1 includes a host 100, a target 200, and a target 210. The host 100 is mainly responsible for initiating data reading/writing, for example, sending a data read/write command. The target 200 and the target 210 are target storage devices, also referred to as NVM subsystems in an NVMe protocol, and are mainly responsible for receiving and executing a data read/write command sent by the host 100. A specific form of the host 100 includes but is not limited to a physical server or a virtual machine in a physical server. The physical server may be a computer device that includes components such as a CPU, a memory, and a network adapter. The target 200 may be a separate physical hard disk system. As shown in FIG. 1, the target 200 includes a network adapter 201 and at least one hard disk. The network adapter 201 is connected to the at least one hard disk. It should be noted that three hard disks are used as an example for description in FIG. 1. In a further implementation, the target 200 may include at least one hard disk. The hard disk in the target 200 may be a storage medium with a storage function, such as a SSD or a HDD. The network adapter 201 has a network interface card function, and may be a remote network interface card (RNIC) in NVMe over fabric. The network adapter 201 performs, with the host 100 using fabric network, communication related to a data read/write command or data transmission.

The target 210 has a structure similar to that of the target 200, and includes a network adapter 211 and at least one hard disk. Functions and implementations of components (the network adapter 211, the hard disk, and the like) in the target 210 are similar to functions and implementations of components (the network adapter 201 and the hard disk) in the target 200. In a further implementation, there may be multiple targets. In FIG. 1, only two targets (the target 200 and the target 210) are shown as an example for description.

In an example of FIG. 1, the host 100 needs to store data in the target 200, and a process in which the host 100 sends data and the target 200 receives data is described in the following and includes the following steps.

Step S100: When the host 100 needs to store data in the target 200, the host 100 sends a command using a write command, and the write command usually carries to-be-stored data. If the to-be-stored data is in a relatively large amount and cannot be carried or sent by the host 100 using the write command (for example, the to-be-stored data exceeds a maximum amount of data that can be carried in the write command), the host 100 may add an SGL to the write command. The SGL includes one field, for example, the field may be an entry, and the field includes information such as a source address that is of the to-be-stored data and that is in the host 100, a length of the to-be-stored data, and a destination address that is of the to-be-stored data and that is in the target 200. It should be noted that the SGL may include multiple fields, for example, multiple entries. Each entry includes information such as a source address that is of the to-be-stored data and that is in the host 100, a length of the to-be-stored data, and a destination address that is of the to-be-stored data and that is in the target 200. When the to-be-stored data includes multiple address segments, that is, when the to-be-stored data is not continuous in the host 100, and exists in the multiple address segments, multiple entries need to be used to record the data in the multiple address segments. In an example for description in this embodiment of the present disclosure, the SGL includes one entry.

In an example for describing the following steps, the to-be-stored data of the host 100 exceeds the amount of data that can be carried in the write command, and the host 100 needs to notify the target 200 of address information and the length of the to-be-stored data using the SGL in the write command.

Step S101: The host 100 sends the write command to the target 200 using a network adapter 103, where the write command includes the SGL.

Optionally, the to-be-stored data may be at least one data block. Because a length of the data block is fixed, a length of the to-be-stored data may be recorded using a quantity of data blocks.

Step S102: After receiving the write command, the network adapter 201 in the target 200 obtains a length that is of the to-be-stored data and that is carried in the write command, and allocates a corresponding storage space in a network adapter memory (not shown in FIG. 1) of the network adapter 201, that is, allocates, in the network adapter memory of the network adapter 201, a storage space that is the same as the length that is of the to-be-stored data and that is carried in the write command, to buffer the to-be-stored data that is sent by the host 100.

Step S103: After allocating the storage space that is required for buffering the data, the network adapter 201 instructs, using a RDMA command, the network adapter 103 to transmit the to-be-stored data in an RDMA manner, that is, instructs the network adapter 103 to read the to-be-stored data according to the source address that is of the to-be-stored data and that is in the host 100; receives the to-be-stored data that is transmitted by the network adapter 103 using a network; and buffers the received to-be-stored data in a storage space of the network adapter memory.

In step S102, the storage space of the network adapter memory of the network adapter 201 may be insufficient. For example, a current remaining storage space of the network adapter memory of the network adapter 201 is 10 K bytes, but a length of to-be-buffered data is 20 K bytes. In this case, the storage space fails to be allocated because the network adapter 201 has no sufficient storage space to buffer the to-be-stored data. The network adapter 201 cannot reallocate a storage space for buffering the to-be-stored data until another storage space of the network adapter memory is released and an available storage space of the network adapter memory is greater than or equal to a storage space occupied by the to-be-stored data.

Similarly, when the host 100 sends a data read request to the target 200, the host 100 sends a read command to the network adapter 201. If to-be-read data exceeds an amount of data that can be carried in the read command, the read command includes an SGL, and the SGL carries a source address that is of the to-be-read data and that is in the target 200, a length of the to-be-read data, and a destination address that is of the to-be-read data and that is in the host 100.

When the network adapter 201 buffers the to-be-read data, if the available storage space of the network adapter memory is less than a storage space occupied by the to-be-read data, the network adapter 201 cannot reallocate a storage space for buffering the to-be-read data or buffer the to-be-read data until another storage space of the network adapter memory is released and the available storage space of the network adapter memory is greater than or equal to the storage space occupied by the to-be-read data.

In the foregoing process in which the host 100 writes data into or reads data from the target 200, a dynamic management (such as searching for an idle storage space, waiting for release of another storage space, or reapplying for an available storage space) operation of the network adapter memory of the network adapter 201 brings many complexities to a design and an implementation of the network adapter 201. For example, these complexities include at least one of the following:

(1) When the storage space of the network adapter memory of the network adapter 201 is less than a storage space occupied by to-be-transmitted data, the network adapter 201 needs to buffer a corresponding write command or read command.

(2) When the network adapter 201 fails to obtain, by means of application, an available storage space in a long time (for example, the network adapter memory of the network adapter 201 has no available storage space in a long time), a mechanism needs to be designed to age (for example, delete) a write command or a read command that is buffered for a long time.

(3) After a write command or a read command that is buffered for a long time is aged, a mechanism is further required to notify the host 100 that the host 100 needs to resend a related command or a related data.

It should be noted that, in an example of the foregoing description, the write command or the read command carries an SGL. In an actual use scenario, the write command or the read command may directly carry corresponding data, and the foregoing problems still exist. Alternatively, when the host 100 and the target 200 are based on another interaction mechanism, for example, when the host 100 interacts with the target 200 in another manner different from an RDMA command, if the target 200 also uses a dynamic management mechanism of the network adapter memory, the foregoing problems still exist. The foregoing scenario is merely a scenario instance listed for describing the problems of the existing technical solution, and the further instance does not constitute a limitation on an application scenario of the present disclosure.

To resolve the technical problem, the embodiments of the present disclosure provide a method, device, and system for controlling a data read/write command in NVMe over fabric. In an example for describing the following embodiments, a host is connected to one target to transfer data. A case in which a host is connected to multiple targets to transfer data may be implemented with reference to a case in which a host is connected to one target, and details are not described.

It should be noted that, in a further implementation, a target that is used as a storage device may receive, using a network adapter, a separate FPGA chip, or a CPU in the target, a data read/write command sent by a host that is used as a control device. In the embodiments of the present disclosure, the network adapter, the FPGA chip, or the CPU that is in the storage device and that receives the data read/write command sent by the control device is collectively referred to as a data processing unit. It may be understood that the data processing unit in the embodiments of the present disclosure may be a unit or an entity that has a same function as the network adapter, the FPGA chip, or the CPU. Any unit or entity that can receive and process a data read/write command sent by the host used as the control device can be used as the data processing unit in the storage device in the embodiments of the present disclosure.

When the network adapter is used as the data processing unit in the storage device, a network adapter memory is configured to buffer data to be transmitted according to a data read/write command received by the network adapter. When the FPGA chip is used as the data processing unit in the storage device, a storage unit in the FPGA chip is configured to buffer data to be transmitted according to a data read/write command received by the FGPA chip. When the CPU in the storage device is used as the data processing unit in the storage device, a memory of the CPU is configured to buffer data to be transmitted according to a data read/write command received by the CPU, that is, the data is buffered by sharing the memory of the CPU. In addition, the buffer unit in the target, for example, a buffer device in which a DDR is used as a cache may also be used as a cache of the network adapter, the FPGA chip, or the CPU. In the embodiments of the present disclosure, the network adapter memory, the storage unit in the FPGA chip, the buffer unit in the target, or the memory of the CPU is collectively referred to as a buffer unit. It may be understood that the buffer unit in the embodiments of the present disclosure may be another storage medium that has a same function as the network adapter memory, the storage unit in the FPGA chip, or the memory of the CPU. Any storage medium that can be used to buffer data to be transmitted according to a data read/write command sent by the host used as the control device can be used as the buffer unit in the storage device in the embodiments of the present disclosure. In addition, the network adapter memory, the storage unit in the FPGA chip, the memory of the CPU, and the buffer unit in the target may form a buffer resource pool. In a further implementation, one or more of the network adapter, the FPGA chip, or the CPU may receive a data read/write command sent by the host, and buffer, in the buffer resource pool, data that needs to be transmitted.

In the following example for describing the embodiments of the present disclosure, a network adapter is used as a data processing unit in a storage device, a network adapter memory is used as a buffer unit in the storage device, a target is used as the storage device, and a host is used as a control device. It may be understood that for an implementation of using an FPGA chip or a CPU as the data processing unit, refer to an implementation of using the network adapter as the data processing unit. For an implementation of using a storage unit in the FPGA chip, a buffer unit in the target, or a memory of the CPU as the buffer unit or an implementation of a resource pool including a storage unit in the FPGA chip, a buffer unit in the target, and a memory of the CPU, refer to an implementation of using the network adapter memory as the buffer unit, and details are not described.

Figure 2:
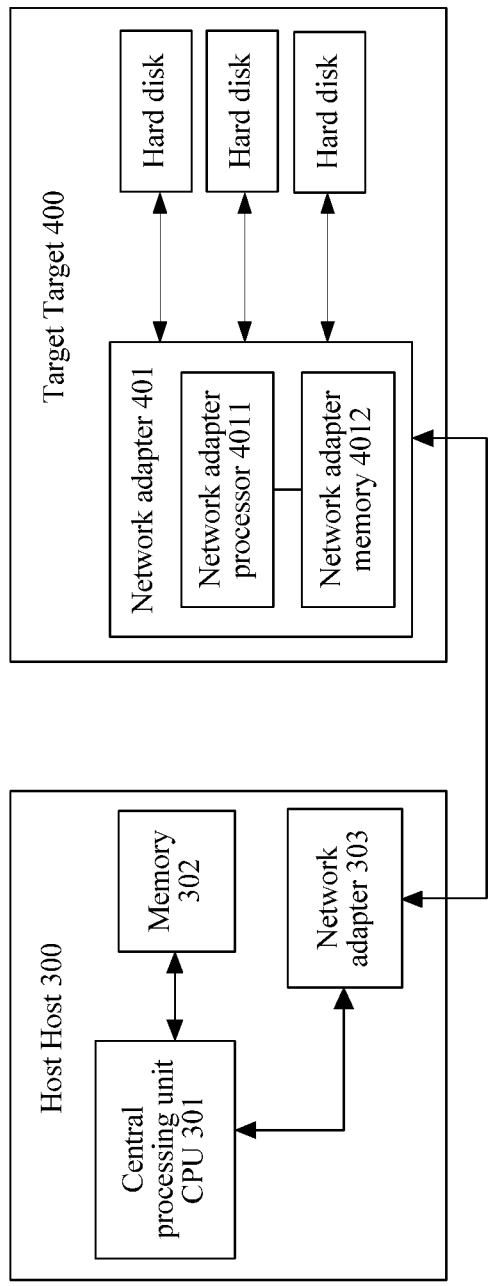
FIG. 2 is a schematic structural diagram of an implementation in which a host is connected to one target to transfer data according to an embodiment of the present disclosure.

FIG. 2 is a schematic structural diagram of an implementation in which a host is connected to one target to transfer data according to an embodiment of the present disclosure. As shown in FIG. 2, a host 300 is connected to a target 400 using fabric network. Further, the host 300 may be connected to and communicate with the target 400 using a network such as iWarp, ROCE, Infiniband, an FC, or Omni-Path.

The host 300 includes hardware components such as a CPU 301, a memory 302, and a network adapter 303. The target 400 includes a network adapter 401 and at least one hard disk. The host 300 is a host and is mainly responsible for initiating data reading/writing, for example, sending a data read/write command. A specific form of the host 300 includes but is not limited to a physical server or a virtual machine in a physical server. The physical server may be a computer device that includes components such as a CPU, a memory, and a network adapter. It should be noted that when the host 300 is a virtual machine in a physical server, the hardware components such as the CPU 301, the memory 302, and the network adapter 303 that are included in the host 300 are resources such as a CPU, a memory, and a network adapter that are allocated by the physical server to the virtual machine for use. Similarly, the network adapter 401 in the target 400 may be a virtual network adapter. The virtual network adapter is a network adapter resource that is allocated by a physical network adapter in the target 400 to the virtual network adapter for use.

The target 400 is a target storage device, also referred to as an NVM subsystem in the NVMe over fabric architecture, and is mainly responsible for receiving and executing a read/write command sent by the host 300. The hard disk in the target 400 may be a medium with a storage function, such as an SSD or an HDD. In FIG. 2, three hard disks are used as an example for description. The network adapter 401 includes a network adapter processor 4011 and a network adapter memory 4012. The network adapter 401 has a network interface card function, and may be an RNIC in NVMe over fabric. The network adapter 401 performs, with the host 300 using a network in the NVMe over fabric architecture, communication related to a data read/write command or data transmission. In an example for description in FIG. 2, the network adapter memory 4012 is located in the network adapter 401, that is, the network adapter 401 includes the network adapter memory 4012. In a further implementation, the network adapter memory 4012 may be located outside the network adapter 401. That is, the network adapter memory in the target 400 may be a storage medium independent of the network adapter 401. In this embodiment of the present disclosure, the storage medium independent of the network adapter 401 may be a storage medium such as a DDR. In another optional implementation, the network adapter memory 4012 of the network adapter 401 may be a memory resource pool including memory resources of multiple network adapters in the target 400. A specific presentation form of the network adapter memory is not limited in this embodiment of the present disclosure.

To avoid a prior-art problem of a complex processing mechanism caused when data to be transmitted according to a data read/write command sent by the host 300 cannot be buffered because a storage space of the network adapter memory of the network adapter 401 is insufficient, in an example for describing in detail a method for controlling a data read/write command in NVMe over fabric according to an embodiment of the present disclosure, the host 300 needs to send a write command to the target 400 to write to-be-stored data into the target 400.

Figure 3:
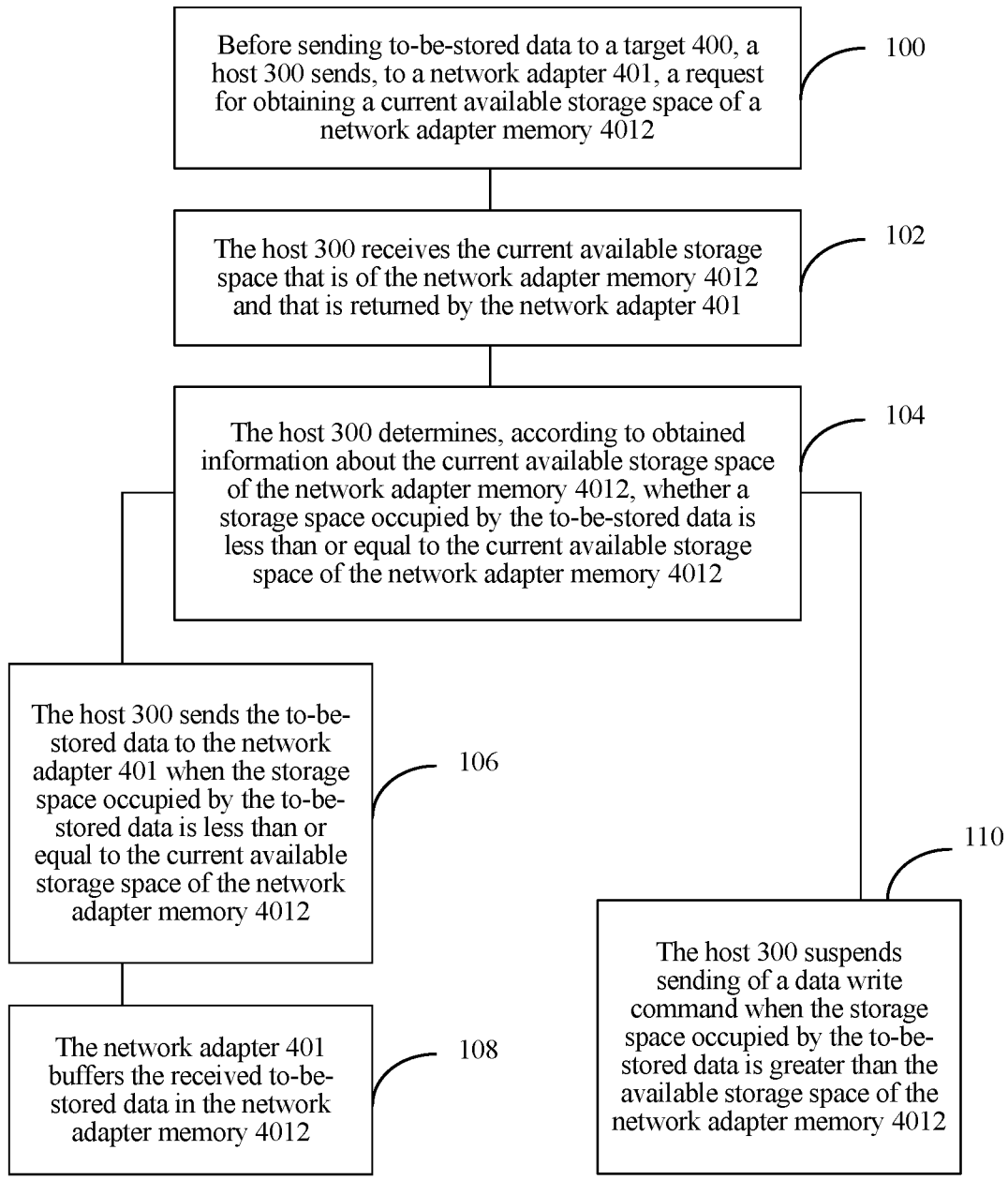
FIG. 3 is a schematic flowchart of a method for controlling a data read/write command in NVMe over fabric according to an embodiment of the present disclosure.

When the host 300 needs to write the to-be-stored data into the target 400, the host 300 first obtains an available storage space of the network adapter memory 4012 in the target 400. Only when the available storage space of the network adapter memory 4012 is greater than or equal to a storage space occupied by the to-be-stored data, the host 300 sends, to the network adapter 401, a write command that carries address information and a length that are of the to-be-stored data. In this way, a problem of a complex processing mechanism caused by buffering the write command of the host 300 when the available storage space of the network adapter memory 4012 is insufficient can be avoided. Further, as shown in FIG. 3, a further implementation process of the method includes the following steps.

Step 100: Before sending a data write command to the target 400, the host 300 sends, to the network adapter 401, a request for obtaining an available storage space of the network adapter memory 4012.

The available storage space of the network adapter memory 4012 is a storage space that is not occupied in the network adapter memory 4012 when the network adapter 401 receives the request sent by the host 300 for obtaining the available storage space of the network adapter memory 4012. It may be understood that the storage space that is not occupied in the network adapter memory 4012 is a space that is in the network adapter memory 4012 and that is not used for buffering data. For example, when data is buffered in the network adapter memory 4012, and the data has not been written into a hard disk or has not been read by the host 300, the buffered data occupies a storage space of the network adapter memory 4012, and the occupied storage space cannot be used to buffer other data.

The to-be-stored data is data to be written into the target 400 by the host 300. The host 300 needs to send the to-be-stored data to the network adapter 401 using a write command. For example, the host 300 adds an SGL to the write command. The SGL includes information such as a source address that is of the to-be-stored data and that is in the host 300, a length of the to-be-stored data, and a destination address that is of the to-be-stored data and that is in the target 400. The host 300 sends, to the network adapter 401, the write command that carries the SGL.

The host 300 may send the request for obtaining the available storage space of the network adapter memory 4012 to the network adapter 401 by sending a request message. The request message carries information for requesting the network adapter 401 to return the available storage space of the network adapter memory 4012. The request message may be implemented in any message form. Information about the available storage space returned by the network adapter memory 4012 may be implemented in any form of information for indicating the available storage space of the network adapter memory 4012. For example, the request message may be a request packet. The request packet includes a field for obtaining the available storage space of the network adapter memory 4012. In this embodiment of the present disclosure, neither a form of the request message nor a form of information that is carried in the request message and that is used for instructing the network adapter 401 to return the available storage space of the network adapter memory 4012 is limited. Alternatively, the host 300 may obtain information about the available storage space of the network adapter memory 4012 by reading a register in which the information about the available storage space of the network adapter memory 4012 is recorded.

Step 102: The host 300 receives the available storage space that is of the network adapter memory 4012 and that is returned by the network adapter 401.

Further, after receiving the request sent by the host 300 for obtaining the available storage space of the network adapter memory 4012, the network adapter 401 may return the information about the available storage space of the network adapter memory 4012 to the host 300 by adding the information to a response message. The host 300 obtains the information about the available storage space of the network adapter memory 4012 that is carried in the response message.

The available storage space that is of the network adapter memory 4012 and that is returned by the network adapter 401 is an available storage space of the network adapter memory 4012 when the network adapter 401 receives the request sent by the host 300. Therefore, the available storage space that is of the network adapter memory 4012 and that is returned by the network adapter 401 to the host 300 is a real-time available storage space of the network adapter memory 4012.

Step 104: The host 300 determines, according to obtained information about the available storage space of the network adapter memory 4012, whether a storage space occupied by to-be-stored data is less than or equal to the available storage space of the network adapter memory 4012.

For example, a size of the available storage space of the network adapter memory 4012 is 100 MB, and the storage space occupied by the to-be-stored data is 50 MB. Whether the storage space occupied by the to-be-stored data is less than or equal to the available storage space of the network adapter memory 4012 may be determined by determining that 50 MB is less than 100 MB. Alternatively, a length of the available storage space of the network adapter memory 4012 is 50 data blocks, and the storage space occupied by the to-be-stored data is 60 data blocks. Whether the storage space occupied by the to-be-stored data is less than or equal to the available storage space of the network adapter memory 4012 may be determined by determining that 60 data blocks are greater than 50 data blocks.

Step 106: The host 300 sends the data write command to the target 400 when the storage space occupied by the to-be-stored data is less than or equal to the available storage space of the network adapter memory 4012.

For further comparison, refer to the foregoing description. In a further implementation, that the host 300 sends the data write command to the target 400 may be: The host 300 sends the data write command to the network adapter 401, adds an SGL to the data write command, and adds address information of the to-be-stored data and the length of the to-be-stored data to the SGL. That is, the SGL includes the information such as the source address that is of the to-be-stored data and that is in the host 300, the length of the to-be-stored data, and the destination address that is of the to-be-stored data and that is in the target 400.

Step 108: The network adapter 401 in the target 400 receives the data write command, and buffers, in the network adapter memory 4012, data to be stored according to the data write command.

Further, the network adapter 401 may receive the to-be-stored data using a network adapter 303 in an RDMA manner according to the source address that is of the to-be-stored data and in the host 300 and that is carried in the SGL in the write command, and buffer the to-be-stored data in the network adapter memory 4012.

Step 110: The host 300 suspends sending of the data write command when the storage space occupied by the to-be-stored data is greater than the available storage space of the network adapter memory 4012.

In this way, the host 300 sends the to-be-stored data using the write command only when the to-be-stored data can be buffered in the available storage space of the network adapter memory 4012, such that a problem of a complex processing mechanism caused by buffering the write command when the available storage space of the network adapter memory 4012 is insufficient can be avoided.

Optionally, after sending of the data write command has been suspended for a preset time, the host 300 may resend the request for obtaining the available storage space of the network adapter memory 4012, to determine whether the data to be stored according to the data write command can be buffered in the available storage space of the network adapter memory 4012. That is, step 100 is reperformed until the host 300 buffers the to-be-stored data in the network adapter memory 4012.

The preset time for which sending of the data write command has been suspended by the host 300 may be a default time in a system or a preconfigured time. In a time range that is set by the preset time, the host 300 does not perform step 100. Further, the preset time for which sending of the to-be-stored data has been suspended by the host 300 may be set by setting a timer in the host 300. After a time that is set in the timer expires, the host 300 restarts step 100 to step 110. It may be understood that the preset time for which sending of the data write command has been suspended by the host 300 may be flexibly set according to a specific service status.

In step 108, the to-be-stored data is buffered in the network adapter memory 4012. Alternatively, after step 110, the host 300 suspends sending of the data write command for the preset time, reperforms step 100 to step 110, and buffers the to-be-stored data in the network adapter memory 4012. In the two cases, the to-be-stored data that is buffered in the network adapter memory 4012 is migrated to a hard disk in the target 400. Further, after the to-be-stored data is buffered in the network adapter memory 4012, the network adapter 401 modifies the write command, modifies the source address that is of the to-be-stored data and in the host 300 and that is carried in the write command into an address that is in the network adapter memory 4012 and that is used for storing the to-be-stored data, and sends the modified write command to a controller of a destination hard disk. That is, an SGL carried in the write command sent by the network adapter 401 to the controller of the destination hard disk includes information such as the address that is in the network adapter memory 4012 and that is used for storing the to-be-stored data, the length of the to-be-stored data, and the destination address that is of the to-be-stored data and that is in the target 400.

The destination hard disk is determined by the network adapter 401 according to the destination address that is of the to-be-stored data and in the target 400 and that is in the write command. The network adapter 401 can determine, according to the destination address that is of the to-be-stored data and that is in the target 400, a hard disk that is of the target 400 and in which the to-be-stored data is located, and determine a disk in which the destination address that is of the to-be-stored data and that is in the target 400 is located as the destination hard disk. In the target 400, each hard disk is corresponding to one address segment. The network adapter 401 determines, according to the destination address that is of the to-be-stored data and in the target 400 and that is in the SGL in the write command, an address segment to which the destination address belongs. A hard disk corresponding to the address segment is the destination hard disk.

After determining the destination hard disk, the network adapter 401 sends the modified write command to the controller of the destination hard disk. The controller of the destination hard disk reads the to-be-stored data from the network adapter memory 4012 according to the address that is of the to-be-stored data and in the network adapter memory 4012 and that is carried in the received write command, and writes the to-be-stored data into a storage space corresponding to the destination address in the destination hard disk. Optionally, the controller of the destination hard disk may write, in an RDMA manner or a DMA manner, the to-be-stored data into the storage space corresponding to the destination address in the destination hard disk. In this embodiment of the present disclosure, the network adapter 401 is connected to the hard disk in the target 400 based on an NVMe over PCIe architecture. Therefore, data can be transmitted or migrated between the controller of the destination hard disk in the target 400 and the network adapter 401 by means of connection and communication in the NVMe over PCIe, that is, the controller of the destination hard disk may write the to-be-stored data from the network adapter memory 4012 to the destination hard disk in a manner specified in an NVMe over PCIe protocol.

A control module in the network adapter 401 may modify the write command and send the modified write command to the controller of the destination hard disk. The control module may be a physical chip (for example, a processor such as an ARM, X86, or a power PC), or may be a software module that runs on the physical chip, or may be one or more virtual controllers created on a physical chip using a virtual machine technology. The control module may be a physical controller or an NVM controller in NVMe over fabric.

In a further implementation, when the available storage space of the network adapter memory 4012 is large enough and a relatively large amount of data can be buffered, and when to-be-stored data of the host 300 can be buffered in the available storage space of the network adapter memory 4012, the host 300 may not need to send, each time before sending a data read/write command, the request for obtaining the information about the available storage space of the network adapter memory 4012. Another optional implementation provided in this embodiment of the present disclosure may be as follows.

The host 300 may directly send a data read/write command to the network adapter 401, and start the procedure of step 100 to step 110 only after receiving a backpressure packet sent by the network adapter 401 for indicating that to-be-stored data cannot be buffered.

For example, when sending a data write command, for example, sending a second data write command, the host 300 may directly send the second data write command to the network adapter 401 without a need to obtain the available storage space of the network adapter memory 4012. After the host 300 sends the second data write command to the network adapter 401, the network adapter 401 returns a backpressure message to the host 300 if data to be transmitted according to the second data write command cannot be buffered in the available storage space of the network adapter memory 4012, that is, when data to be stored according to the second data write command cannot be buffered. The backpressure message indicates that the storage space of the network adapter memory 4012 is insufficient and the data to be stored according to the second data write command sent by the host 300 cannot be buffered.

The host 300 starts the procedure of step 100 to step 110 only after receiving the backpressure packet sent by the network adapter 401 for indicating that the to-be-stored data cannot be buffered. That is, after receiving the backpressure packet returned by the network adapter 401, and before sending another data read/write command, the host 300 sends the request for obtaining the available storage space of the network adapter memory 4012 to the network adapter 401, and sends the another data read/write command using the data read/write command only after determining that the available storage space of the network adapter memory 4012 is greater than or equal to a storage space occupied by to-be-transmitted data.

It should be noted that the first data read/write command and the second data read/write command in this embodiment of the present disclosure are merely used to distinguish different data read/write commands and do not represent a sequence or preference of the first data read/write command and the second data read/write command.

Further, after a preset time within which the procedure of step 100 to step 110 is performed expires, the process of step 100 to step 110 may not need to be performed again when the storage space of the network adapter memory 4012 is restored and has enough space for storing the to-be-stored data. That is, after the preset time within which the procedure of step 100 to step 110 is performed expires, when the to-be-stored data needs to be sent to the network adapter 401, the host 300 directly sends the to-be-stored data to the network adapter 401 and does not send the request for obtaining the available storage space of the network adapter memory 4012. The preset time used for performing the procedure of step 100 to step 110 may be further set according to a requirement, or may be a default time in a system, or may be a time that is set based on a time predelivered by an administrator. In addition, the preset time used for performing the procedure of step 100 to step 110 may be changed in real time according to an actual service status. For example, when an occupation proportion of the storage space of the network adapter memory 4021 is relatively large, a preset time required for performing the procedure of step 100 to step 110 is long. When the occupation proportion of the storage space of the network adapter memory 4021 is relatively small, the preset time used for performing the procedure of step 100 to step 110 is short.

In this way, the host 300 sends, only when the storage space of the network adapter memory 4012 is insufficient, the request for obtaining the available storage space of the network adapter memory 4012 to the network adapter 401 before sending a data read/write command to the target 400. In addition, the host 300 determines, based on the available storage space that is of the network adapter memory 4012 and that is returned by the network adapter 401, whether to send the data read/write command. In this way, a technical problem in the prior art can be effectively resolved, efficiency of sending a data read/write command by the host 300 can be further improved, and a resource occupied by the host 300 for sending the request for obtaining the available storage space of the network adapter memory 4012 can be reduced. Similarly, because the network adapter 401 does not need to return the available storage space to the host 300 each time before receiving a data read/write command, a resource occupied by the network adapter 401 is also accordingly reduced.

In the foregoing embodiment, the backpressure message sent by the network adapter 401 to the host 300 may be a directly generated message, or may be a message that is carried in the response message. For example, the backpressure message may be a message that is directly generated when the available storage space of the network adapter memory 4012 is insufficient, or may be information that is carried in the response message returned by the network adapter 401 to the host 300 for the write command and that indicates that the available storage space of the network adapter memory 4012 is insufficient. A message or a packet of another type can be used as the backpressure message sent by the network adapter 401 to the host 300, provided that the message or the packet can carry a message that indicates that the available storage space of the network adapter memory 4012 is insufficient and the to-be-stored data of the host 300 cannot be buffered. Optionally, information that is carried in the backpressure message and that indicates that the available storage space of the network adapter memory 4012 is insufficient and cannot store the to-be-stored data of the host 300 may be an error code, a preset identifier, or the like. Any information can be used as the information that is carried in the backpressure message and that indicates that the available storage space of the network adapter memory 4012 is insufficient, provided that the information can indicate that or notify the host 300 that the available storage space of the network adapter memory 4012 cannot store the to-be-stored data sent by the host 300.

Further, after receiving the backpressure message sent by the network adapter 401, in a process of performing step 100 to step 110, the host 300 further retransmits a data read/write command, for example, the second data write command, that is not executed because the available storage space of the network adapter memory 4021 is insufficient. That is, for a data read/write command that is not executed when the network adapter 401 generates the backpressure message because the available storage space of the network adapter memory 4021 is insufficient, the host 300 resends the data read/write command when the host 300 determines that the available storage space of the network adapter memory 4021 can store data to be transmitted according to the data read/write command.

In this embodiment of the present disclosure, the CPU 301 in the host 300 may perform the process of step 100 to step 106 and step 110. Alternatively, the network adapter 303 in the host 300 may perform the process of step 100 to step 106 and step 110. Alternatively, a chip or a logic component in the host 300 may perform the process of step 100 to step 106 and step 110. For example, an FPGA chip may perform the process of step 100 to step 106 and step 110.

In an actual implementation, step 100 to step 106 and step 110 may be implemented by at least one of the CPU 301, the network adapter 303, or a chip or a logic component in the host 300. For example, the network adapter 303 performs step 100 to step 104, and the CPU 301 performs step 106 and step 110; or the CPU 301 performs step 100 to step 104, and the network adapter 303 performs step 106 and step 110. Alternatively, the chip or the logic component in the host 300 may perform step 100 and step 102, the CPU 301 performs step 104, step 106, and step 110; or the network adapter 303 performs step 100 and step 102, and the chip or the logic component in the host 300 performs step 104, step 106, and step 110. A further implementation of an execution body for performing step 100 to step 106 and step 110 is not limited in this embodiment of the present disclosure.

When the host 300 is implemented using a virtual machine, the CPU 301 and the network adapter 303 are respectively corresponding to a CPU and a network adapter in the virtual machine. The CPU and the network adapter in the virtual machine are implemented using a physical CPU and a physical network adapter that carry virtual functions of the CPU and the network adapter. An implementation of the CPU and the network adapter is similar to the foregoing implementation, and details are not described.

An implementation in which the host 300 reads data from the target 400 is similar to the foregoing implementation in which the host 300 writes data into the target 400, and may be implemented with reference to the process in which the host 300 sends the data write command to the target 400. That is, when the data read/write command sent by the host 300 to the target 400 is a data read command, an implementation process is similar to the process in which the data read/write command is a data write command. For example, before sending the data read command to the target 400, the host 300 sends a request for obtaining the available storage space of the network adapter memory 4012 to the network adapter 401. The host 300 determines, according to the obtained available storage space of the network adapter memory 4012, whether a storage space occupied by to-be-read data is less than or equal to the available storage space of the network adapter memory 4012. The host 300 sends a read command to the network adapter 401 when the storage space occupied by the to-be-read data is less than or equal to the available storage space of the network adapter memory 4012. The host 300 suspends sending of the read command when the storage space occupied by the to-be-read data is greater than the available storage space of the network adapter memory 4012. In this way, a problem caused by buffering the read command in a data reading process when the storage space of the network adapter memory 4012 is insufficient is avoided. In addition, before sending the data read command to the target 400, the host 300 performs the step of sending the request for obtaining the available storage space of the network adapter memory 4012 to the network adapter 401 only after receiving a backpressure packet sent by the network adapter 401 for indicating that the to-be-stored data or to-be-read data cannot be buffered. That is, the host 300 does not send, each time of sending a read command, the request for obtaining the available storage space of the network adapter memory 4012, but first sends the read command or the write command, and when sending the read command, sends, only after receiving a backpressure message sent by the network adapter 401 for indicating that the to-be-stored data cannot be buffered, the request for obtaining the available storage space of the network adapter memory 4012. The host 300 suspends sending of the read command when determining that the storage space occupied by the to-be-read data is greater than the available storage space of the network adapter memory 4012, or sends the read command when the storage space occupied by the to-be-read data is less than or equal to the available storage space of the network adapter memory 4012.

The architecture shown in FIG. 2 is used as an example. To avoid a prior-art problem of a complex processing mechanism caused when a storage space of a network adapter memory is insufficient, another implementation method provided in an embodiment of the present disclosure is as follows: A host 300 obtains and records a real-time available storage space of a network adapter memory 4012, and determines, each time before sending a data read/write command to a target 400, whether the recorded real-time available storage space of the network adapter memory 4012 is greater than or equal to a storage space occupied by to-be-transmitted data. When the recorded real-time available storage space of the network adapter memory 4012 is greater than or equal to the storage space occupied by the to-be-transmitted data, the host 300 sends the data read/write command to the network adapter 401, and subtracts the storage space occupied by the to-be-transmitted data from the recorded real-time available storage space of the network adapter memory 4012. After the to-be-transmitted data that is buffered in the network adapter memory 4012 is migrated, the host 300 adds, according to a received response message that indicates completion of the migration, the recorded real-time available storage space of the network adapter memory 4012 and the storage space occupied by the to-be-transmitted data.

If the recorded real-time available storage space of the network adapter memory 4012 is less than the storage space occupied by the to-be-transmitted data, the host 300 suspends sending of the data read/write command, and resends the data read/write command when the recorded real-time available storage space of the network adapter memory 4012 is greater than or equal to the storage space occupied by the to-be-transmitted data.

The host 300 sends the data read/write command to the target 400 when the network adapter memory 4021 has a sufficient available storage space to buffer the to-be-transmitted data. Therefore, a problem of a complex processing mechanism caused by buffering, when the available storage space of the network adapter memory 4021 of the network adapter 401 is insufficient, the data read/write command sent by the host 300 can be avoided. In the following, an implementation process of the foregoing method is described in detail by separately using two cases: The data read/write command is a write command, and the data read/write command is a read command.

Figure 4A:
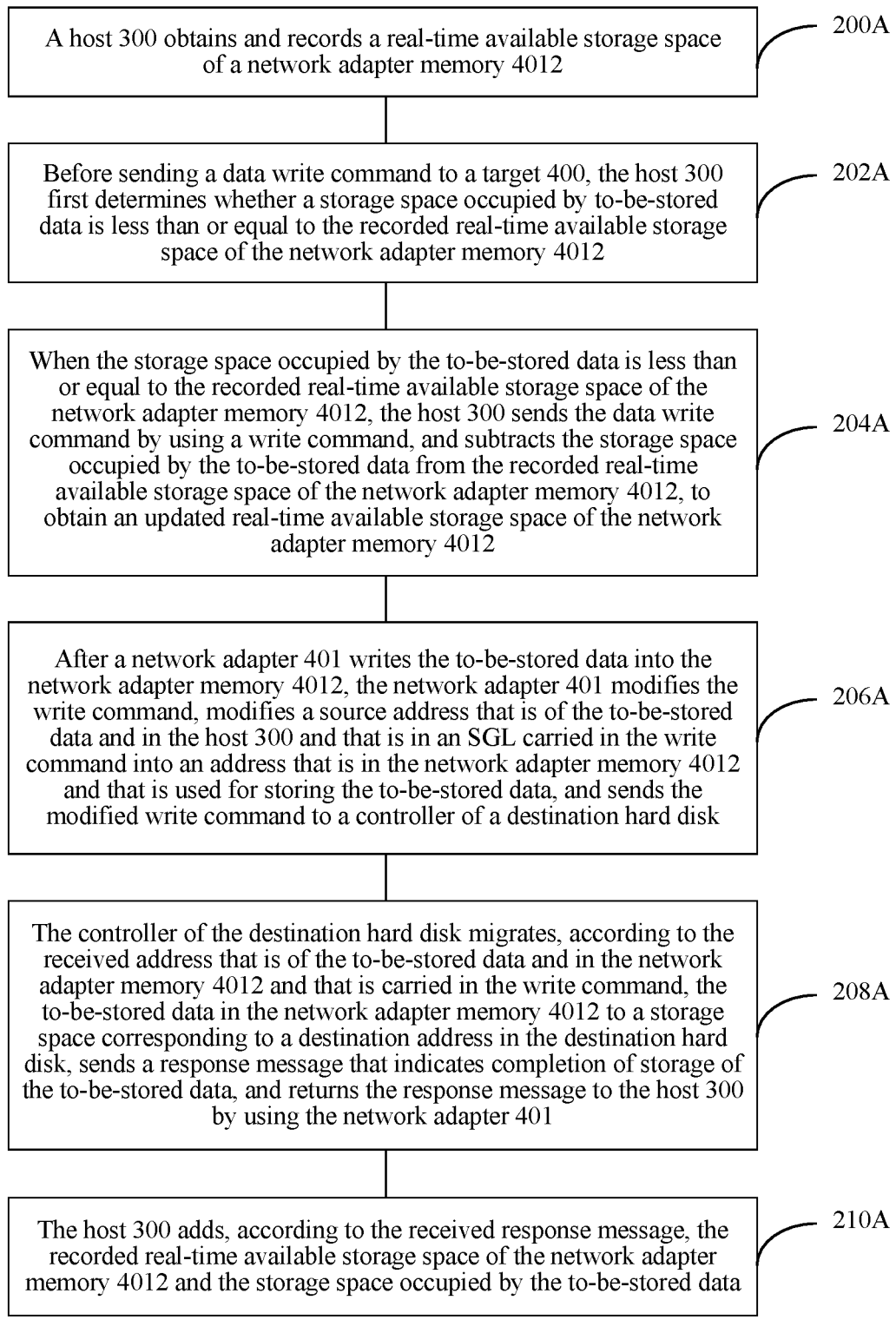
FIG. 4A is a schematic flowchart of an implementation case of another method for controlling a data read/write command in NVMe over fabric according to an embodiment of the present disclosure.

When the data read/write command is a data write command, as shown in FIG. 4A, a detailed implementation process of the foregoing method includes the following steps.

Step 200A: A host 300 obtains and records a real-time available storage space of a network adapter memory 4012.

The host 300 may locally record the obtained available storage space of the network adapter memory 4012, that is, record the obtained available storage space of the network adapter memory 4012 in the host 300.

Further, the host 300 may obtain the available storage space of the network adapter memory 4012 when the target 400 is powered on and initialized. Because no data is buffered in the network adapter memory 4012 when the target 400 is powered on and initialized, the obtained available storage space of the network adapter memory 4012 is a total storage space of the network adapter memory 4012. When the total storage space of the network adapter memory 4012 is used as the recorded real-time available storage space of the network adapter memory 4012, a storage space of the network adapter memory 4012 can be maximally used.

Optionally, the host 300 may obtain a current available storage space of the network adapter memory 4012 at any time after the target 400 is powered on and initiated, use the obtained current available storage space of the network adapter memory 4012 as the real-time available storage space of the network adapter memory 4012, and record the real-time available storage space. In this case, the obtained available storage space of the network adapter memory 4012 is less than the total storage space of the network adapter memory 4012 because data is buffered in the network adapter memory 4012.

The host 300 may obtain the current available storage space of the network adapter memory 4012 by sending a request packet, and the request packet includes a field for obtaining the available storage space of the network adapter memory 4012. After receiving the request packet sent by the host 300, the network adapter 401 writes the current available storage space of the network adapter memory 4012 into the corresponding field of the request packet and returns the request packet to the host 300. Alternatively, the host 300 may obtain information about the available storage space of the network adapter memory 4012 by reading a register in which the information about the current available storage space of the network adapter memory 4012 is recorded.

Step 202A: Before sending a data write command to the target 400, the host 300 first determines whether a storage space occupied by to-be-stored data is less than or equal to the recorded real-time available storage space of the network adapter memory 4012.

Further, the host 300 may obtain the locally recorded real-time available storage space of the network adapter memory 4012, and determine whether the storage space occupied by the to-be-stored data is less than or equal to the locally recorded real-time available storage space of the network adapter memory 4012.

The real-time available storage space that is of the network adapter memory 4012 and that is recorded by the host 300 may be a size of a recorded space that can store data. Correspondingly, the storage space occupied by the to-be-stored data may be a size of the storage space occupied by the to-be-stored data. Whether the storage space occupied by the to-be-stored data is less than or equal to the recorded real-time available storage space of the network adapter memory 4012 may be determined by determining whether the size of the storage space occupied by the to-be-stored data is less than or equal to a size of the recorded real-time available storage space of the network adapter memory 4012.

Certainly, the real-time available storage space of the network adapter memory 4012 may be recorded in another form. For example, the real-time available storage space of the network adapter memory 4012 may be recorded using a quantity of data blocks that can be written. Correspondingly, the storage space occupied by the to-be-stored data may be a quantity of data blocks of the to-be-stored data. Whether the storage space occupied by the to-be-stored data is less than or equal to the recorded real-time available storage space of the network adapter memory 4012 may be determined by determining whether the quantity of data blocks of the to-be-stored data is less than or equal to a recorded quantity of data blocks that can be written into the network adapter memory 4012.

Step 204A: When the storage space occupied by the to-be-stored data is less than or equal to the recorded real-time available storage space of the network adapter memory 4012, the host 300 sends the data write command using a write command, and subtracts the storage space occupied by the to-be-stored data from the recorded real-time available storage space of the network adapter memory 4012, to obtain an updated real-time available storage space of the network adapter memory 4012.

The host 300 sends the data write command to the target 400 using the write command. In addition, the host 300 may add an SGL to the write command. The SGL includes information such as a source address that is of the data to be stored according to the data write command and that is in the host 300, a length of the to-be-stored data, and a destination address that is of the to-be-stored data and that is in the target 400. After receiving the write command sent by the host 300, the network adapter 401 in the target 400 obtains the to-be-stored data according to the source address that is of the to-be-stored data and in the host 300 and that is carried in the write command, and buffers the to-be-stored data in the storage space of the network adapter memory 4012. Optionally, the network adapter 401 may obtain the to-be-stored data using a network adapter 303 in an RDMA manner, and buffer the to-be-stored data in the storage space of the network adapter memory 4012.

After the network adapter 401 buffers the to-be-stored data in the storage space of the network adapter memory 4012, the to-be-stored data occupies the storage space of the network adapter memory 4012. Therefore, after sending the to-be-stored data using the write command, the host 300 needs to subtract the storage space occupied by the to-be-stored data from the recorded real-time available storage space of the network adapter memory 4012.

Step 206A: After the network adapter 401 writes the to-be-stored data into the network adapter memory 4012, the network adapter 401 modifies the write command, modifies a source address that is of the to-be-stored data and in the host 300 and that is in an SGL carried in the write command into an address that is in the network adapter memory 4012 and that is used for storing the to-be-stored data, and sends the modified write command to a controller of a destination hard disk.

That is, an SGL carried in the write command sent by the network adapter 401 to the controller of the destination hard disk includes information such as the address that is in the network adapter memory 4012 and that is used for storing the to-be-stored data, the length of the to-be-stored data, and the destination address that is of the to-be-stored data and that is in the target 400.

The destination hard disk is determined by the network adapter 401 according to the destination address that is of the to-be-stored data and in the target 400 and that is in the write command. The network adapter 401 can determine, according to the destination address that is of the to-be-stored data and that is in the target 400, a hard disk that is of the target 400 and in which the to-be-stored data is located, and determine a disk in which the destination address that is of the to-be-stored data and that is in the target 400 is located as the destination hard disk. In the target 400, each hard disk is corresponding to one address segment. The network adapter 401 determines, according to the destination address that is of the to-be-stored data and in the target 400 and that is in the SGL in the write command, an address segment to which the destination address belongs. A hard disk corresponding to the address segment is the destination hard disk.

It may be understood that a control module in the network adapter 401 may modify the write command and send the modified write command to the controller of the destination hard disk. The control module may be implemented by a physical chip (for example, a processor such as an ARM, X86, or a power PC), or may be implemented by a software module that runs on the physical chip, or may be one or more virtual controllers created on a physical chip using a virtual machine technology. The control module may be a physical controller or an NVM controller in an NVMe over fabric architecture.

Step 208A: The controller of the destination hard disk migrates, according to the received address that is of the to-be-stored data and in the network adapter memory 4012 and that is carried in the write command, the to-be-stored data in the network adapter memory 4012 to a storage space corresponding to a destination address in the destination hard disk, sends a response message that indicates completion of storage of the to-be-stored data, and returns the response message to the host 300 using the network adapter 401.

The network adapter 401 is connected to a hard disk in the target 400 based on an NVMe over PCIe architecture. Correspondingly, data can be transmitted or migrated between the controller of the destination hard disk in the target 400 and the network adapter 401 by means of connection and communication in NVMe over PCIe, and the controller of the destination hard disk may write the to-be-stored data from the network adapter memory 4012 to the destination hard disk in a manner specified in an NVMe over PCIe protocol.

Step 210A: The host 300 adds, according to the received response message, the recorded real-time available storage space of the network adapter memory 4012 and the storage space occupied by the to-be-stored data.

After the host 300 receives the response message that indicates that the to-be-stored data is stored, the to-be-stored data has been migrated from the network adapter memory 4012 to the hard disk. The network adapter memory 4012 may add a corresponding available storage space, that is, release the storage space occupied by the to-be-stored data. Therefore, when the host 300 adds the locally recorded real-time available storage space of the network adapter memory 4012 and the storage space occupied by the to-be-stored data, a currently latest available storage space of the network adapter memory 4012 can be correctly recorded.

In step 202A, if the host 300 determines that the storage space occupied by the to-be-stored data is greater than the locally recorded real-time available storage space of the network adapter memory 4012, the host 300 reperforms step 202A after waiting for a preset time. The preset time for which the host 300 waits may be a default preset time, or may be a preset time that is set based on a specific service requirement. After the preset time expires, the host 300 reperforms step 202A, that is, redetermines whether the storage space occupied by the to-be-stored data is less than or equal to the locally recorded real-time available storage space of the network adapter memory 4012. Step 204A and step 206A are performed if the storage space occupied by the to-be-stored data is less than or equal to the locally recorded real-time available storage space of the network adapter memory 4012. The host 300 reperforms step 202A after the preset time, so as to avoid occupation and consumption of a resource of the host 300 that are caused by repeatedly performing the step of determining when the available storage space of the network adapter memory 4012 is less than the storage space occupied by the to-be-stored data. It may be understood that the preset time for which the host 300 waits may be flexibly adjusted based on an actual situation.

Figure 4B:
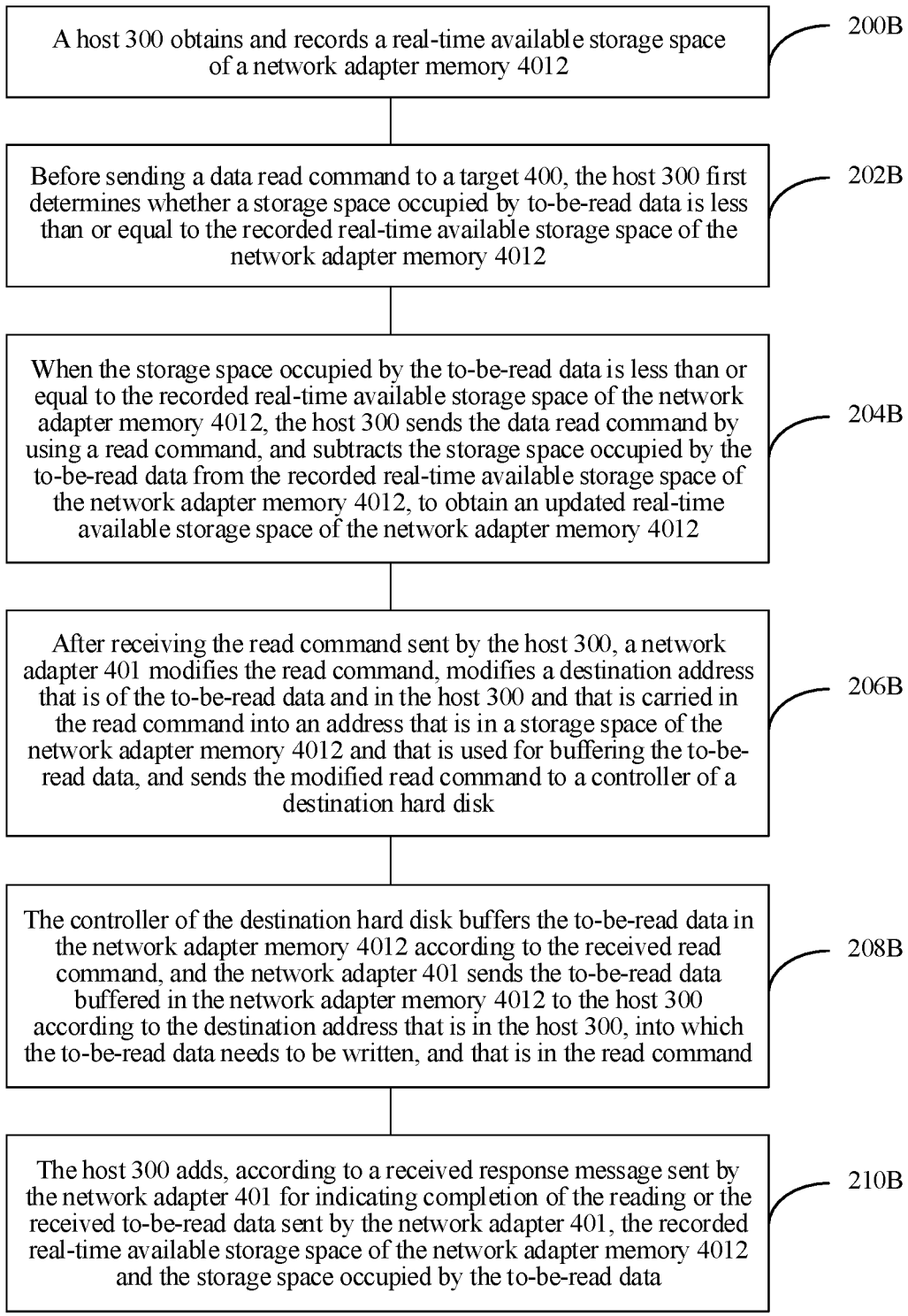
FIG. 4B is a schematic flowchart of another implementation case of another method for controlling a data read/write command in NVMe over fabric according to an embodiment of the present disclosure.

When the data read/write command is a read command, as shown in FIG. 4B, a detailed implementation process of the method is as follows:

Step 200B: A host 300 obtains and records a real-time available storage space of a network adapter memory 4012.

For a further implementation process of step 200B, refer to step 200A, and details are not described herein.

Step 202B: Before sending a data read command to a target 400, the host 300 first determines whether a storage space occupied by to-be-read data is less than or equal to the recorded real-time available storage space of the network adapter memory 4012.

Further, the host 300 may obtain the locally recorded real-time available storage space of the network adapter memory 4012, and determine whether the storage space occupied by the to-be-read data is less than or equal to the locally recorded real-time available storage space of the network adapter memory 4012.

Step 204B: When the storage space occupied by the to-be-read data is less than or equal to the recorded real-time available storage space of the network adapter memory 4012, the host 300 sends the data read command using a read command, and subtracts the storage space occupied by the to-be-read data from the recorded real-time available storage space of the network adapter memory 4012, to obtain an updated real-time available storage space of the network adapter memory 4012.

When the host 300 sends the data read command using the read command, the host 300 may add an SGL to the read command. The SGL includes information such as a source address that is of the to-be-read data and that is in the target 400, a length of the to-be-read data, and a destination address that is of the to-be-read data and that is in the host 300.

Step 206B: After receiving the read command sent by the host 300, a network adapter 401 modifies the read command, modifies a destination address that is of the to-be-read data and in the host 300 and that is carried in the read command into an address that is in a storage space of the network adapter memory 4012 and that is used for buffering the to-be-read data, and sends the modified read command to a controller of a destination hard disk. That is, an SGL carried in the read command sent by the network adapter 401 to the controller of the destination hard disk includes the information such as the source address that is of the to-be-read data and that is in the target 400, the length of the to-be-read data, and the address that is in the storage space of the network adapter memory 4012 and that is used for buffering the to-be-read data. The controller of the destination hard disk migrates the to-be-read data to the storage space of the network adapter memory 4012 according to the received and modified read command. Optionally, the controller of the destination hard disk migrates, in a DMA manner or an RDMA manner, the to-be-read data to the storage space that is of the network adapter memory 4012.

The destination hard disk is determined by the network adapter 401 according to the source address that is of the to-be-read data and in the target 400 and that is in the read command. The network adapter 401 can determine, according to the source address that is of the to-be-read data and that is in the target 400, a hard disk that is in the target 400 and in which the to-be-read data is located, and determine a hard disk in which the source address that is of the to-be-read data and that is in the target 400 is located as the destination hard disk.

After the network adapter 401 buffers the to-be-read data in the storage space of the network adapter memory 4012, the to-be-read data occupies the storage space of the network adapter memory 4012. Therefore, after sending the to-be-read data using the read command, the host 300 needs to subtract the storage space occupied by the to-be-read data from the recorded real-time available storage space of the network adapter memory 4012.

It may be understood that a control module in the network adapter 401 may modify the read command and send the modified read command to the controller of the destination hard disk. The control module may be implemented by a physical chip (for example, a processor such as an ARM, X86, or a power PC), or may be implemented by a software module that runs on the physical chip, or may be one or more virtual controllers created on a physical chip using a virtual machine technology. The control module may be a physical controller or an NVM controller in NVMe over fabric.

Step 208B: The controller of the destination hard disk buffers the to-be-read data in the network adapter memory 4012 according to the received read command, and the network adapter 401 sends the to-be-read data buffered in the network adapter memory 4012 to the host 300 according to the destination address, into which the to-be-read data needs to be written, that is in the host 300 and that is in the read command.

Optionally, the network adapter 401 sends the buffered to-be-read data to the host 300 in an RDMA manner.

Optionally, after sending the buffered to-be-read data to the host 300, the network adapter 401 sends, to the host 300, a response message that indicates completion of the reading.

Step 210B: The host 300 adds, according to a received response message sent by the network adapter 401 for indicating completion of the reading or the received to-be-read data sent by the network adapter 401, the recorded real-time available storage space of the network adapter memory 4012 and the storage space occupied by the to-be-read data.

Further, the host 300 adds, according to the received response message sent by the network adapter 401 for indicating completion of the reading or the received to-be-read data sent by the network adapter 401, the locally recorded real-time available storage space of the network adapter memory 4012 and the storage space occupied by the to-be-read data.

After the host 300 receives the response message that indicates completion of the reading or the to-be-read data, the to-be-read data has been migrated from the network adapter memory 4012 to the host 300. The network adapter memory 4012 may add a corresponding available storage space, that is, release the storage space occupied by the to-be-read data. Therefore, when the host 300 adds the locally recorded real-time available storage space of the network adapter memory 4012 and the storage space occupied by the to-be-read data, a currently latest available storage space of the network adapter memory 4012 can be correctly recorded.

In step 202B, if the host 300 determines that the storage space occupied by the to-be-read data is greater than the locally recorded real-time available storage space of the network adapter memory 4012, the host 300 waits for a preset time before reperforming step 202B. The preset time for which the host 300 waits may be a default preset time, or may be a preset time that is set based on a specific service requirement. After the preset time expires, the host 300 reperforms step 202B, that is, redetermines whether the storage space occupied by the to-be-read data is greater than the locally recorded real-time available storage space of the network adapter memory 4012, and step 204B and step 206B are performed if the storage space occupied by the to-be-read data is less than or equal to the locally recorded real-time available storage space of the network adapter memory 4012. The host 300 reperforms step 202B after the preset time, so as to avoid occupation and consumption of a resource of the host 300 that are caused by repeatedly performing the step of determining when the available storage space of the network adapter memory 4012 is less than the storage space occupied by the to-be-read data. It may be understood that the preset time for which the host 300 waits may be flexibly adjusted based on an actual situation.

In the foregoing process, a CPU 301 in the host 300 may perform the process of step 200A to step 204A and step 210A, or a CPU 301 performs the process of step 200B to step 204B and step 210B. Alternatively, a network adapter 303 in the host 300 may perform the process of step 200A to step 204A and step 210A, or a network adapter 303 performs the process of step 200B to step 204B and step 210B. Alternatively, a chip or a logic component in the host 300 may perform the process of step 200A to step 204A and step 210A, or a chip or a logic component in the host 300 performs the process of step 200B to step 204B and step 210B. For example, an FPGA chip may perform the process of step 200A to step 204A and step 210A, or perform the process of step 200B to step 204B and step 210B.

In an actual implementation, step 200A to step 204A and step 210A, or step 200B to step 204B and step 210B may be implemented by at least one of a CPU 301, a network adapter 303, or a chip or a logic component in the host 300. For example, the CPU 301 performs step 200A and step 202A, and the network adapter 303 performs step 204A and step 210A. Alternatively, the CPU 301 performs step 200B and step 202B, and the FPGA chip performs step 204B and step 210B. A specific implementation of an execution body for performing a process of step 200A to step 204A and step 210A or a process of step 200B to step 204B and step 210B is not limited in this embodiment of the present disclosure.

When the host 300 is implemented using a virtual machine, the CPU 301 and the network adapter 303 are respectively corresponding to a CPU and a network adapter in the virtual machine. The CPU and the network adapter in the virtual machine are implemented using a physical CPU and a physical network adapter that carry virtual functions of the CPU and the network adapter. An implementation of the CPU and the network adapter is similar to the foregoing implementation, and details are not described.

In step 200, the host 300 may record, at multiple locations, the real-time available storage space of the network adapter memory 4012. For example, the real-time available storage space may be recorded in a dedicated storage space in the host 300, for example, a dedicated chip that is configured to store the real-time available storage space of the network adapter memory 4012. Alternatively, the real-time available storage space may be stored in an existing storage component in the host 300, for example, a cache of the CPU 301, or a cache of the network adapter 303, or a storage space of the FPGA chip.

Further, when the CPU 301 performs step 200A to step 202A, the CPU 301 may store the obtained real-time available storage space of the network adapter memory 4012 in a cache of the CPU 301, or another storage space of the host 300, or a newly-added storage chip in the host 300. When the network adapter 303 or the FPGA chip performs step 204A to step 206A, the network adapter 303 or the FPGA chip may control the real-time available storage space of the network adapter memory 4012 from a location that is in the CPU 301 and that stores the real-time available storage space of the network adapter memory 4012, for example, perform an operation of adding or deleting. It may be understood that, when execution bodies of step 200A to step 206A or step 200B to step 206B are in another combination manner, an implementation is similar to the implementation in the foregoing example, and details are not described.

In this embodiment of the present disclosure, there may be multiple implementations for the recording, by the host 300, the real-time available storage space of the network adapter memory 4012. For example, the host 300 records the real-time available storage space of the network adapter memory 4012 in a form of a table or in a form of a variable. A specific form of recording the real-time available storage space of the network adapter memory 4012 is not limited in this embodiment of the present disclosure.

Figure 5:
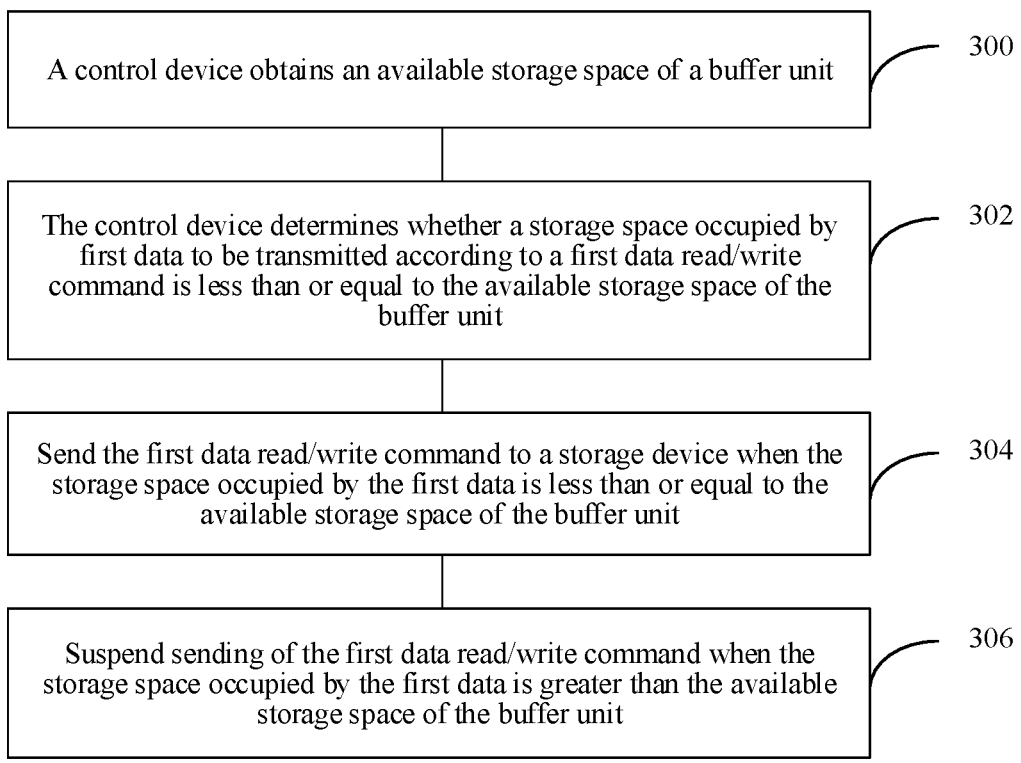
FIG. 5 is a schematic flowchart of a method for controlling a data read/write command between a control device and a storage device in an NVMe over fabric architecture according to an embodiment of the present disclosure.

FIG. 5 is a schematic flowchart of a method for controlling a data read/write command between a control device and a storage device in an NVMe over fabric architecture according to an embodiment of the present disclosure. The storage device includes a data processing unit, a buffer unit, and a storage unit, and the control device stores, in the storage unit, data that needs to be read/written. The data processing unit is configured to receive a data read/write command sent by the control device. The buffer unit is configured to buffer data to be transmitted according to the read/write command. As shown in FIG. 5, the method includes the following steps:

Step 300: The control device obtains an available storage space of the buffer unit.

Step 302: The control device determines whether a storage space occupied by first data to be transmitted according to a first data read/write command is less than or equal to the available storage space of the buffer unit.

Step 304: Send the first data read/write command to the storage device when the storage space occupied by the first data is less than or equal to the available storage space of the buffer unit.

Step 306: Suspend sending of the first data read/write command when the storage space occupied by the first data is greater than the available storage space of the buffer unit.

According to the method shown in FIG. 5, the control device sends the first data read/write command to the storage device when the data to be transmitted according to the first data read/write command can be buffered in the available storage space of the buffer unit, or suspends sending of the first data read/write command when the storage space occupied by the first data is greater than the available storage space of the buffer unit. In this way, a problem of a complex processing mechanism caused by buffering the first data read/write command when the available storage space of the network adapter memory is insufficient can be avoided.

Further, for a method procedure and a further implementation shown in FIG. 5, refer to the method procedure described in FIG. 3, or refer to the implementations of the procedures described in FIG. 4A and FIG. 4B, and details are not described.

It should be noted that FIG. 3, FIG. 4A, and FIG. 4B are described using a network adapter as a data processing unit, and a network adapter memory as a buffer unit. For an implementation in which an FPGA chip or a CPU is used as a data processing unit and a storage unit in the FPGA chip or a memory of the CPU is used as a buffer unit, refer to the implementation of the network adapter and the network adapter memory. In a further implementation, the network adapter memory may be located outside the network adapter, that is, a network adapter memory in the storage device may be a storage medium independent of the network adapter, such as a DDR. Optionally, the network adapter memory may be a memory resource pool including memory resources of multiple network adapters in the storage device. A specific presentation form of the network adapter memory is not limited in this embodiment of the present disclosure.

Figure 6:
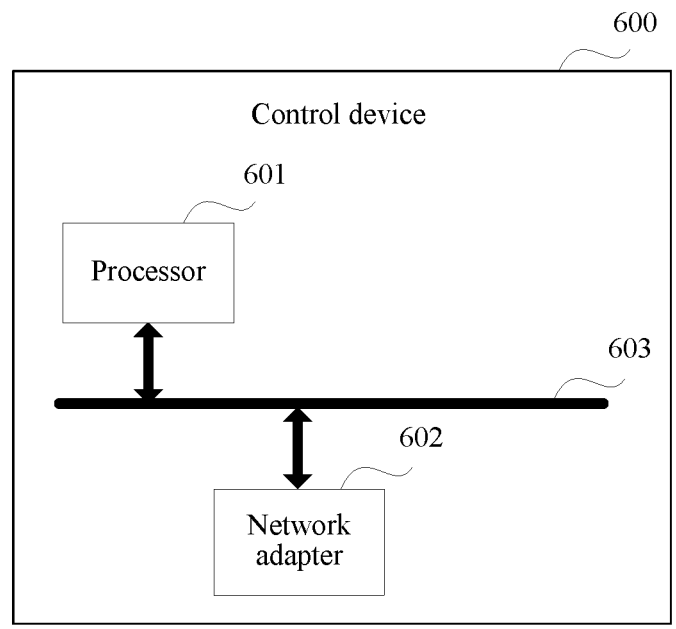
FIG. 6 is a schematic structural diagram of a control device 600 according to an embodiment of the present disclosure.

FIG. 6 is a schematic structural diagram of a control device 600 according to an embodiment of the present disclosure. The control device 600 is a control device in an NVMe over fabric architecture. As shown in FIG. 6, the control device 600 includes a processor 601, a network adapter 602, and a bus 603. The processor 601 is connected to the network adapter 602 using the bus 603. The bus 603 may be a peripheral component interconnect (PCI) bus, an extended industry standard architecture (EISA) bus, or the like. The bus may be classified into an address bus, a data bus, a control bus, and the like. For convenience of indication, the bus is represented using only one thick line in FIG. 6. However, it does not indicate that there is only one bus or only one type of buses.

Data is transmitted between the control device 600 and a storage device in the NVMe over fabric architecture. The storage device includes a remote data processing unit, a buffer unit, and a storage unit. Data that needs to be read/written by the control device 600 is buffered in the buffer unit of the storage device and stored in the storage unit of the storage device. The processor 601 is configured to perform the following steps: obtaining an available storage space of the buffer unit; determining whether a storage space occupied by first data to be transmitted according to a first data read/write command is less than or equal to the available storage space of the buffer unit; and sending the first data read/write command to the storage device when the storage space occupied by the first data is less than or equal to the available storage space of the buffer unit; or suspending sending of the first data read/write command when the storage space occupied by the first data is greater than the available storage space of the buffer unit.

In an implementation of the control device 600, the control device 600 sends the first data read/write command to the storage device when the data to be transmitted according to the first data read/write command can be buffered in the available storage space of the buffer unit, or suspends sending of the first data read/write command when the storage space occupied by the first data is greater than the available storage space of the buffer unit. In this way, a problem of a complex processing mechanism caused by buffering the first data read/write command when the available storage space of the buffer unit is insufficient can be avoided.

Further, for an implementation of the control device 600, refer to the implementation of the host 300 in FIG. 2 and the implementation of the 300 in the procedure shown in FIG. 3, and details are not described. Alternatively, for an implementation of the control device 600, refer to the implementation of the host 300 in FIG. 2 and the implementations of the host 300 in the procedures shown in FIG. 4A and FIG. 4B, and details are not described.

It should be noted that FIG. 3, FIG. 4A, and FIG. 4B are described using a network adapter as a data processing unit, and a network adapter memory as a buffer unit. For an implementation in which an FPGA chip or a CPU is used as a data processing unit, and a storage unit in the FPGA chip or a memory of the CPU is used as a buffer unit, refer to the implementation of the network adapter and the network adapter memory.

Figure 7:
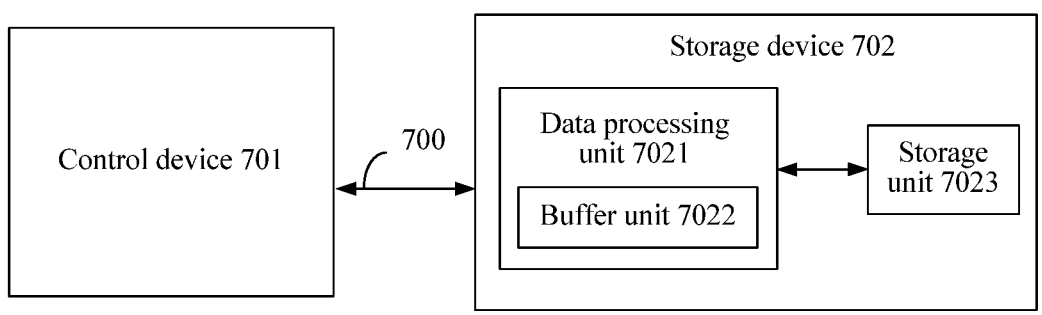
FIG. 7 is a schematic structural diagram of a system 700 for controlling a data read/write command according to an embodiment of the present disclosure.

FIG. 7 is a schematic structural diagram of a system 700 for controlling a data read/write command according to an embodiment of the present disclosure. The system 700 includes a control device 701 and a storage device 702 in an NVMe over fabric architecture. The storage device 702 includes a data processing unit 7021, a buffer unit 7022, and a storage unit 7023. Data that needs to be read/written by the control device 701 is stored in the storage unit 7023. The data processing unit 7021 is configured to receive a data read/write command sent by the control device 701. The buffer unit 7022 is configured to buffer data to be transmitted according to the read/write command.

The control device 701 is configured to: obtain an available storage space of the buffer unit 7022, and determine whether a storage space occupied by first data to be transmitted according to a first data read/write command is less than or equal to the available storage space of the buffer unit 7022.

The control device 701 is further configured to: send the first data read/write command to the storage device 702 when the storage space occupied by the first data is less than or equal to the available storage space of the buffer unit 7022, or suspend sending of the first data read/write command when the storage space occupied by the first data is greater than the available storage space of the buffer unit 7022.

The data processing unit 7021 is configured to: receive the first data read/write command sent by the control device 701, and buffer, in the buffer unit 7022, the data to be transmitted according to the first data read/write command.

In an implementation of the system 700 for controlling a data read/write command, the control device 701 sends the first data read/write command to the storage device 702 when the data to be transmitted according to the first data read/write command can be buffered in the available storage space of the buffer unit 7022, or suspends sending of the first data read/write command when the storage space occupied by the first data is greater than the available storage space of the buffer unit 7022. In this way, a problem of a complex processing mechanism caused by buffering the first data read/write command when the available storage space of the buffer unit 7022 is insufficient can be avoided.

It should be noted that, in an example of FIG. 7, the buffer unit 7022 is located in the data processing unit 7021 to show a structure of the system 700. A location relationship between the buffer unit 7022 and the data processing unit 7021 is not limited in this embodiment of the present disclosure. In a further implementation, the buffer unit 7022 is located outside the data processing unit 7021, or the buffer unit 7022 is a storage space that includes a shared storage space of multiple data processing units 7021 and that is used for buffering data.

Further, for the implementation of the system 700 for controlling a data read/write command, refer to an implementation of a system including the host 300 and the target 400 in FIG. 2 and an implementation of the host 300 and the target 400 in the procedure shown in FIG. 3, and details are not described. Alternatively, for an implementation of the system 700 for controlling a data read/write command, refer to an implementation of a system including the host 300 and the target 400 in FIG. 2 and implementations of the host 300 and the target 400 in the procedures shown in FIG. 4A and FIG. 4B, and details are not described.

It should be noted that FIG. 3, FIG. 4A, and FIG. 4B are described using a network adapter as a data processing unit, and a network adapter memory as a buffer unit. For an implementation in which an FPGA chip or a CPU is used as a data processing unit, and a storage unit in the FPGA chip or a memory of the CPU is used as a buffer unit, refer to the implementation of the network adapter and the network adapter memory.

The methods or steps described with reference to the content disclosed in the present disclosure may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. An example of the storage medium is coupled to the processor, such that the processor can read information from the storage medium, and write information into the storage medium. Certainly, the storage medium may be a component of the processor. The processor and the storage medium may be located in an ASIC. In addition, the ASIC may be located in a core network interface device. Certainly, the processor and the storage medium may be located in the core network interface device as discrete components.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a USB flash drive, a removable hard disk, a ROM, a RAM, a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for controlling a data read/write command between a control device and a storage device in a non-volatile memory express (NVMe) over fabric architecture, the method comprising:
   sending, by the control device, a data read/write command to the storage device that comprises a data processing unit, a buffer unit, and a storage unit;
   storing, by the control device, in the storage unit, data to be written to the storage unit, or data to be read from the storage unit, the data processing unit being configured to receive the data read/write command sent by the control device, the buffer unit being configured to buffer data to be transmitted according to the read/write command;

obtaining, by the control device, an available storage space of the buffer unit, wherein the available storage space of the buffer unit is a real-time available buffer unit space and the available buffer unit storage space is locally recorded in the control device;

determining, by the control device, whether a storage space required by first data to be transmitted based on a first data read/write command being less than or equal to the available storage space;

suspending, by the control device, sending of the first data read/write command if the storage space occupied by the first data is greater than the available storage space;

after sending the first data read/write command, subtracting, by the control device, the storage space occupied by the first data from the locally recorded real-time available storage space of the buffer unit; and after receiving a response message sent by the data processing unit indicating completion of the first data read/write command, adding, by the control device, the locally recorded real-time available storage space of the buffer unit and the storage space occupied by the first data.

2. The method according to claim 1, wherein the method further comprises:

after sending of the first data read/write command has been suspended for a preset time, reobtaining, by the control device, the available storage space of the buffer unit, and sending the first data read/write command to the storage device when the storage space occupied by the first data is less than or equal to the available storage space of the buffer unit.

3. The method according to claim 1, wherein the control device performs, only within the preset time, the step of obtaining an available storage space of the buffer unit and the step of determining whether a storage space occupied by first data to be transmitted based on a first data read/write command being less than or equal to the available storage space of the buffer unit.

4. A control device for a non-volatile memory express (NVMe) over fabric architecture, the control device comprising:

a network adapter; and a processor coupled to the network adapter by a bus, wherein data is transmitted between the control device and a storage device in the NVMe over fabric architecture, with the processor being configured to:

obtain an available storage space of the storage device, wherein the available storage space of the buffer unit is a real-time available buffer unit space and the available buffer unit storage space is locally recorded in the control device;

determine whether a storage space required by a first data to be transmitted based on a first data read/write command being equal to or less than the available storage space;

send the first data read/write command to the storage device if the storage space required by the first data is equal or less than to the available storage space and suspend sending of the first data read/write command if the storage space occupied by the first data is greater than the available storage space;

after sending the first data read/write command, subtract the storage space occupied by the first data from the locally recorded real-time available storage space of the buffer unit; and after receiving a response message that is sent by the data processing unit and indicates completion of the first data read/write command, add the locally recorded real-time available storage space of the buffer unit and the storage space occupied by the first data.

5. The control device according to claim 4, wherein the processor is further configured to:

after sending of the first data read/write command has been suspended for a preset time, reobtain the available storage space of the buffer unit, and send the first data read/write command to the storage device when the storage space occupied by the first data is equal to or less than the available storage space of the buffer unit.

6. The control device according to claim 4, wherein the processor performs, only within the preset time, the step of obtaining an available storage space of the buffer unit and the step of determining whether a storage space occupied by first data to be transmitted based on a first data read/write command is equal to or less than the available storage space of the buffer unit.

7. A system for controlling a data read/write command in a non-volatile memory express (NVMe) over fabric architecture, the system comprising:

a storage device, with the storage device comprising a data processing unit, a buffer unit, and a storage unit, wherein data to be read/written is stored in the storage unit and the buffer unit is configured to buffer data to be transmitted according to the read/write command; and a control device in communication with the storage device, with the control device configured to:

obtain an available storage space of the buffer unit, wherein the available storage space of the buffer unit is a real-time available buffer unit space and the available buffer unit storage space is locally recorded in the control device;

determine whether a storage space occupied by first data to be transmitted based on a first data read/write command being less than or equal to the available storage space; and send the first data read/write command to the storage device if the storage space occupied by the first data is less than or equal to the available storage space and suspend sending of the first data read/write command if the storage space occupied by the first data is greater than the available storage space;

with the data processing unit of the storage device being configured to:

receive the first data read/write command sent by the control device; and buffer, in the buffer unit, the first data to be transmitted according to the first data read/write command;

after sending the first data read/write command, subtracting, by the control device, the storage space occupied by the first data from the locally recorded real-time available storage space of the buffer unit; and after receiving a response message sent by the data processing unit indicating completion of the first data read/write command, adding, by the control device, the locally recorded real-time available storage space of the buffer unit and the storage space occupied by the first data.

8. The system according to claim 7, wherein the control device is further configured to:

after sending of the first data read/write command has been suspended for a preset time, reobtain the available storage space of the buffer unit; and send the first data read/write command to the storage device when the storage space occupied by the first data is less than or equal to the available storage space of the buffer unit.

9. The system according to claim 7, wherein the data processing unit is connected to the storage unit using an NVMe over Peripheral Component Interconnect Express (PCIe) architecture.

10. The system according to claim 7, wherein the data processing unit comprises a controller configured to control transmission of data buffered in the buffer unit to the storage unit, and the controller is a physical controller or a non-volatile memory controller in the NVMe over fabric architecture.

11. A control device for a non-volatile memory express (NVMe) over fabric architecture, the control device comprising:
 a network adapter; and
 a processor coupled to the network adapter by a bus, wherein data is transmitted between the control device and a storage device in the NVMe over fabric architecture, with the processor being configured to:

obtain an available storage space of the storage device;

determine whether a storage space required by a first data to be transmitted based on a first data read/write command being equal to or less than the available storage space; and suspend sending of the first data read/write command if the storage space occupied by the first data is greater than the available storage space, wherein the available storage space of the buffer unit is a real-time available previously presented buffer unit space and the available storage space is locally recorded in the control device;

after sending the first data read/write command, subtracting, by the control device, the storage space occupied by the first data from the locally recorded real-time available storage space of the buffer unit; and after receiving a response message sent by the data processing unit indicating completion of the first data read/write command, adding, by the control device, the locally recorded real-time available storage space of the buffer unit and the storage space occupied by the first data.

* * * * *